(12) United States Patent
Gonda

(10) Patent No.: US 7,102,995 B2
(45) Date of Patent: Sep. 5, 2006

(54) SUPPORTING SDH/SONET APS BRIDGE SELECTOR FUNCTIONALITY FOR ETHERNET

(76) Inventor: Rumi Sheryar Gonda, 106 Steele La., Boxborough, MA (US) 01719

( * ) Notice: Subject to any disclaimer, the term of this patent is extended or adjusted under 35 U.S.C. 154(b) by 76 days.

(21) Appl. No.: 10/731,259

(22) Filed: Dec. 5, 2003

(65) Prior Publication Data

US 2005/0122897 A1    Jun. 9, 2005

(51) Int. Cl.
G01R 31/08    (2006.01)
H04L 12/413   (2006.01)

(52) U.S. Cl. .................. 370/224; 370/445; 370/907

(58) Field of Classification Search ................ None
See application file for complete search history.

(56) References Cited

U.S. PATENT DOCUMENTS

| | | | | |
|---|---|---|---|---|
| 5,412,652 A | * | 5/1995 | Lu ........................ | 370/223 |
| 5,422,760 A | * | 6/1995 | Abbott et al. ............ | 360/46 |
| 5,633,869 A | * | 5/1997 | Burnett et al. ........... | 370/396 |
| 5,978,354 A | * | 11/1999 | Taketomi et al. ......... | 370/226 |
| 6,192,514 B1 | * | 2/2001 | Lurndal ................... | 717/149 |
| 6,363,432 B1 | * | 3/2002 | Laber ...................... | 709/250 |
| 6,614,372 B1 | * | 9/2003 | Shi ......................... | 341/101 |
| 6,766,482 B1 | * | 7/2004 | Yip et al. ................. | 714/717 |
| 2004/0026793 A1 | * | 2/2004 | Sefidvash ................ | 257/778 |

OTHER PUBLICATIONS

Maxim "2:1 Multiplexers and 1:2 demultiplexers with loopback." pp. 1-13 retrieved from the internet at http://www.maxim-ic.com/quick_view2.cfm/gv_pk/3989.

* cited by examiner

*Primary Examiner*—Chau Nguyen
*Assistant Examiner*—Cynthia L. Davis
(74) *Attorney, Agent, or Firm*—Lahive & Cockfield, LLP

(57) ABSTRACT

An Ethernet Automatic Protection Switching (APS) Bridge Selector is provided for supporting SDH/SONET APS standard functionality in Ethernet Networks. In accordance with one embodiment, an Ethernet APS Bridge Selector is provided for bridge, selector, and switchover functionality for a plurality of Physical Layer (PHY) hardware devices. The Ethernet APS Bridge Selector provides support for any Media Access Control (MAC) hardware to PHY interface/interconnect. The Ethernet APS Bridge Selector can be managed via interfaces, signals and/or control/register interfaces.

52 Claims, 8 Drawing Sheets

SUPPORTING SDH/SONET APS BRIDGE SELECTOR FUNCTIONALITY FOR ETHERNET

FIELD OF THE INVENTION

The present invention relates generally to network switching architecture and more specifically to supporting SDH/SONET Automatic Protection Switching (APS) Bridging Selector functionality in an Ethernet network.

BACKGROUND OF THE INVENTION

SDH/SONET (Synchronous Digital Hierarchy/Synchronous Optical Network) standards evolved originally for use in a voice network. SDH is a European version of a standard that is substantially the same as the SONET standard developed in North America. SDH/SONET contains connection oriented synchronous TDM circuit switching technology. The SDH/SONET configured network runs at the same clock domain (e.g., every section of the network can be traced to a primary clock reference). The network allocates fixed bandwidth time slots for each circuit. The SDH/SONET architectures are connection based protocols in that there is a physical circuit arrangement between ports in a switch to establish an end to end path. The digital transitions in signals traveling through an SDH/SONET network occur at the same rate, however there may be a phase difference between the transitions of any two signals caused by time delays or jitter in the transmission system.

Ethernet evolved primarily as a data network. In contrast to SDH/SONET, Ethernet is a connectionless asynchronous Carrier Sense, Multiple Access with Collision Detection (CSMA/CD) packet switching technology. The Ethernet architecture does not rely on a single clock domain like the SDH/SONET architecture. The Ethernet architecture sends a series of packets across the network containing data. Whenever a packet needs to be sent, the transmitter will try to transmit the packet. The Ethernet architecture is also connectionless in that the packets travel from node to node within the network without establishing a logical or physical circuit. The end to end path is discovered through a process called Ethernet "Bridging". Ethernet is fundamentally a Local Area Networking (LAN) technology.

SDH/SONET networks provide reliable, guaranteed available bandwidth, low jitter connections. These characteristics are required for voice quality networks. SDH/SONET, however, is bandwidth inefficient and has a higher overhead than many other network architectures. Ethernet networks, in contrast, provide lower reliability best effort delivery, and low cost bandwidth connections. These characteristics are suitable for data quality networks. Ethernet has non-guaranteed transmission, low overhead, and supports fewer operational functions than SDH/SONET. In SDH/SONET, once the circuit is established, bandwidth is allocated for an application and cannot be used by a different application, even if the original application is not using the bandwidth. In Ethernet, applications only use bandwidth when they need the bandwidth to transmit packets.

In SDH/SONET networks, Automatic Protection Switching (APS) functionality is known. SDH/SONET standards define APS controller as the part of a node that is responsible for generating and terminating information carried in the APS protocol and implementing the APS algorithm. SDH/SONET standards also define APS signaling protocol and APS (K1/K2) bytes. SDH/SONET standards also define various algorithms for linear, ring, and mesh protection. SDH/SONET APS functionality can support 50ms switchover, unidirectional and bi-directional switchover, revertive and non-revertive switchover, manual, or automatic switchover. SDH/SONET APS functionality can also support linear, ring, and mesh topologies, and Line and Path protections. The APS feature enables the switchover of circuits in case of circuit failure and is often utilized in optical network systems. In general, the APS feature organizes a network into a collection of "working" interfaces and "protect" interfaces. When a working interface fails, a protect interface immediately assumes the working interface traffic load. In APS there is a working port/link and a protect port/link. Upon initialization and full functioning of a network system, the working port/link is active and the protect port/link maintains a standby mode. If there is an equipment failure during operation, the protect port/ink becomes the active port/link, taking over for the failed working port/link, i.e., the protect port/link becomes the new working port/link. Under known APS systems, there can be a minimal traffic disruption during the switchover, on the order of less than 50 ms.

In voice networks, SDH/SONET APS Standard functionality provides the architecture for protection in under 50 ms from equipment failure for ring, linear, or mesh topologies. In order for data networks to be able to support voice traffic, the network must be able to provide the same level of protection both in terms of time to recover and working with different network topologies, i.e., support rings and linear topologies. Ethernet is the most common data network data link layer protocol. There is no Ethernet standard providing APS functionality. In order to support SDH/SONET APS Standard functionality in Ethernet network, the Ethernet Architecture needs to be able to support Ethernet APS Bridging, Selector, and Switchover operations.

In Ethernet networks, several standards and proprietary technologies support link failure. Spanning Tree Protocol (STP) IEEE 802.1D standard provides topology changes. STP calculates and maintains the topology by sending and listening to Configuration Messages and several timers. These Configuration Messages are emitted every time a "Hello Timer" times out. Typically this is set to 2 seconds. This means that STP cannot support 50 ms recovery as required for link APS SDH/SONET standard. As the number of nodes grows larger in a STP domain, STP convergence also slows down considerably, potentially taking minutes to converge. Because of polling, STP also consumes some bandwidth. STP was mainly designed for loop resolution, and original assumptions were that topology changes would be infrequent. STP did not place more emphasis on quick recovery from failures. In data networks, quick recovery is most often not a requirement.

Link Aggregation (LA) IEEE 802.3ad standard is designed to support aggregated links. One of the features Link Aggregation is the support of the possibility of one of the physical link failure in the aggregated link. A Link Aggregation Control Protocol (LACP) is defined to automatically configure and maintain aggregations among cooperating systems. These messages are emitted on a regular, periodic basis. Typically, the period is every second for fast rate and every 30 seconds for slow rate. This means that Link Aggregation also does not support 50 ms recovery. Before the standard was formalized, there were several proprietary implementations of link aggregation, most notably the Fast EtherChannel product developed by Cisco Systems.

Recently several proprietary technologies have evolved to accomplish the 50 ms second recovery requirement for carrier networks. These technologies can be classified into two main categories: Ethernet based and new non-Ethernet based. In Ethernet based systems most technologies use 20 ms based "Heartbeat" or "Hello" protocol polling to detect link failure, along with upper layer software, to recover within 50 ms. Atrica's Atrica Resilient Ethernet Access (AREA) framework technology is an example of such a protocol. Occam Networks Ethernet Protection Switching (EPS) technology is also a protocol example. Internet Photonics uses interframe gap in Ethernet to support similar functionality.

There are other Ethernet efforts in progress that are attempting to solve the fast recovery problem. The Rapid Spanning Tree Protocol (RSTP) IEEE Committee is working on modifications to STP, but currently, there is a requirement of 1 second guaranteed convergence/recovery, not 50 ms. Ethernet First Mile IEEE Committee is also working on modifying Ethernet to support 50 ms recovery.

Non Ethernet based technologies being defined include Metro Ethernet Forum, which uses Multi Label Protocol Switching (MPLS) to support protection. Resilient Packet Ring (RPR) technology is being defined by RPR Alliance. RPR is a new protocol that is not compatible with Ethernet protocol, but is designed to support 50 ms recovery in rings.

Most of the above mentioned technologies solve limited functionality for Ethernet. Typically, they support 50 ms protection either in a linear or ring environment, but not both. In addition, they are limited to link failures. They address only a subset of the capabilities as defined by the SDH/SONET APS standard.

SUMMARY

There is a need in the art for APS functionality on an Ethernet network as defined by the SDH/SONET APS standard. The present invention is directed toward further solutions to address this need.

In accordance with one example embodiment of the present invention, Ethernet APS Bridge Selector hardware for supporting Automatic Protection Switching (APS) functionality has an Ethernet APS Bridge Selector Sublayer.

In accordance with example aspects of the present invention, an Ethernet APS Bridge Selector Sublayer for managing a bridge and selector; and to interconnect Media Access Control (MAC) hardware and a plurality of Physical Layer (PHY) hardware. The Ethernet APS Bridge Selector can provide architecture to support for Standard SDH/SONET APS functionality in Ethernet Architecture. This allows for 1+1 protection switch, 1:1 protection switch, 1:n protection switch architectures in Linear APS. It also allows for various Link and Path protection architectures for Ring APS, including Unidirectional and Bidirectional, 2 fiber or 4 fiber, revertive and non-revertive protections, drop and continue, ring interworking, and interconnection between rings.

In accordance with further aspects of the present invention, the Ethernet APS Bridge Selector can interface with any MAC using RS interface primitives. The Bridge Selector Sublayer interface can be any PHY interface such as XGMII, GMII, MII, and the like. The Bridge Selector Sublayer interface also can be any Attachment Unit Interface (AUI) such as XAUI and the like.

In accordance with another aspect of the present invention, the Ethernet APS Bridge Selector based on configuration can be a bridge and/or selector. The Ethernet APS Bridge Selector can support bridging, selector, and switchover operations. The Ethernet APS Bridge Selector provides switchover within 50 ms for recovery/protection functionality. The Ethernet APS Bridge Selector can be unidirectional or bidirectional. The Ethernet APS Bridge Selector can be in pass through bridge or selector mode. The Ethernet APS Bridge Selector can be used in various nested and/or non nested combinations.

In accordance with further aspects of the present invention, the Ethernet APS Bridge Selector provides PLS interface, MII or AUI signals, and control/register interfaces to manage APS functionality.

In accordance with another aspect of the present invention, a method of providing APS functionality on an Ethernet protocol network includes configuring an Ethernet APS Bridge Selector in bridge mode and bridging the transmit traffic to working and protect channels.

In accordance with another aspect of the present invention, a method of providing APS functionality on an Ethernet protocol network includes configuring an Ethernet APS Bridge Selector in selector mode, selecting the receive traffic from working and/or protect channels, and switchover from active to standby channel when requested. The method can execute within 50 ms to provide recovery functionality. The switchover can be to an optional specified channel number.

In accordance with another aspect of the present invention, a method of providing APS functionality on an Ethernet protocol network includes a bridging operation, selector operation, and switchover from active to standby channel when requested. The method can execute within 50 ms to provide recovery functionality. The method can further provide support for standard SDH/SONET APS functionality for linear, ring, and mesh topologies for Ethernet protocol networks.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
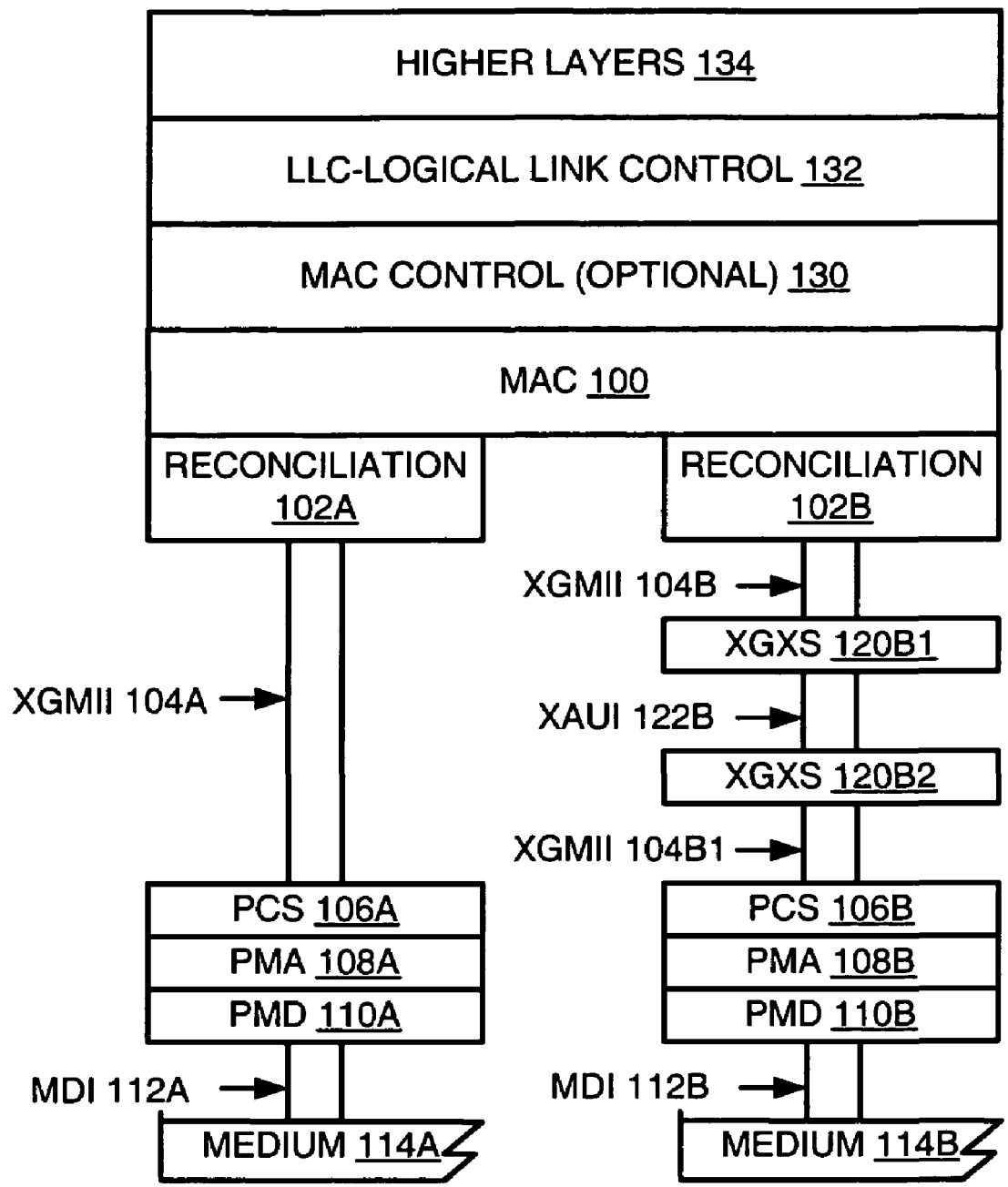
FIG. 1 is a diagrammatic illustration of the conventional IEEE 802.3 CSMA/CD LAN Model as described in prior art.

Illustrative embodiments of the present invention relate to the implementation of standard SDH/SONET APS Bridge Selector functionality within an Ethernet architecture. Note that an APS Bridge is different from an Ethernet Bridge. The term bridge as utilized herein refers to the APS bridge unless explicitly qualified as an Ethernet Bridge. In order to support SDH/SONET APS Bridge Selector functionality in the Ethernet architecture, the present invention extends the Ethernet Reconciliation Sublayer (RS). The Ethernet Reconciliation Sublayer is a sublayer of a physical layer. The Ethernet Reconciliation sublayer resides between the MAC (the Media Access Control, which is an entity or algorithm utilized in negotiating access to a shared or dedicated communications channel) and various PHYs (where the PHYsical Interface converts the data stream coming from the MAC into electrical or optical signals appropriate for the medium in use and vice versa). The Ethernet Reconciliation sublayer provides a mapping between the signals provided at the Media Independent Interface (MII) and the Physical Layer Signaling MAC/PLS service definition.

Depending on the PHYs they connect to, there are several MII variations. MII was originally defined for Ethernet (10 Mb/s) and modified for Fast Ethernet (100 Mb/s). Gigabit MII (GMII) was defined for Gigabit Ethernet (1000 Mb/s or 1 Gb/s). Ten (X in roman numerical) GMII XGMII was defined for 10 Gigabit Ethernet (10 GB/s). In addition for 10 Gigabit Ethernet a XGMII Extender Sublayer (XGXS) and 10 Gigabit Attachment Unit Interface (XAUI) were also defined. Ten-Bit Interface (TBI) and various other interfaces (standard and proprietary) are also defined to interconnect various sublayers.

The present invention supports SDH/SONET Bridge Selector functionality for any Ethernet MAC to PHY interconnect interfaces. However, for clarity in describing the invention, the description contained herein utilizes XGMII and XAUI terminology to describe the network and implement the Ethernet APS Bridge Selector functionality. One of ordinary skill in the art will appreciate that the functionality can also be implemented for any other interfaces used to interconnect the MAC and the PHY.

Aspects of the present invention include additional Ethernet Reconciliation PLS service primitives for Bridge and Selector functionality needed to support SDH/SONET APS functionality in Ethernet. The Bridge is defined as the action of transmitting identical traffic on both the working and protection channels. The act of transmitting identical traffic on both the working and protection channels is called bridging. An Ethernet APS Bridge Selector in bridge mode can be referred to as a splitter. The Selector (sometimes also referred to as a Switch) is defined as the action of selecting the better of the two received traffic signals on both the working and the protection channels. The act of changing the source of the received traffic between the working and protection channels is called switching or switchover. As defined by SDH/SONET linear and ring APS Standards, there can be more than one set of working channels. And there is only one protection channel. This allows for 1+1 protection switch, 1:1 protection switch, 1:n protection switch architectures in Linear APS. It also allows for various Link and Path protection architectures for Ring APS, including, Unidirectional and Bidirectional, two-fiber or four-fiber, revertive and non-revertive protections, drop and continue, ring interworking, and interconnection between rings. The Ethernet MAC APS Control sublayer can be the client for the modified Reconciliation sublayer. The MAC APS control sublayer uses the Reconciliation sublayer Bridge Selector infrastructure provided in accordance with the present invention to implement standard APS functionality.

The present invention does not alter the Ethernet framing, thus it is backward compatible and conforms to Ethernet Standards. Because it optionally modifies the Ethernet Reconciliation Sublayer, XGXS, XGMII, and/or XAUI (or other RS to PHY interconnect interfaces), users have the option of choosing to implement the functionality of the present invention. The method of the present invention is modular and isolated from the Ethernet MAC, Reconciliation, XGXS, and PHY sublayers, thus the apparatus of the present invention has simple optional modifications to existing RS, XGMII (or other MII interfaces), and XAUI. The implementation of the present invention is fully compliant with the SDH/SONET standard protocol because it reuses standard SDH/SONET APS definitions and process. The present invention can be implemented to support switchover within 50 ms or less, based at least in part on the provision of register access for MAC clients or higher layers and signals for MAC Control and Reconciliation sublayers. In addition, the present invention supports protection for linear, mesh, and ring topologies, physical level, logical level, and path level protection, and 1+1, N+1, and N:1 protection.

FIGS. 4 through 8, wherein like parts are designated by like reference numerals throughout, illustrate example embodiments of methods for implementing an SDH/SONET APS Bridge and Selector in an Ethernet environment, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed in a manner still in keeping with the spirit and scope of the present invention.

In order to appreciate operation of the illustrative embodiments described herein, it is helpful to understand the Open Systems Interconnect (OSI) network hierarchy, which views a network as being comprised of several hierarchical layers. In the hierarchy, Layer 1 is the physical layer containing elements that perform the transmission of signals within the network. Layer 2 is the data link layer, which provides services that allow direct communication between devices across the underlying physical channel of Layer 1. Layer 3 is the network layer, which is responsible for station-to-station data delivery over multiple data links. The network layer is responsible for the routing of packets across the network. Layer 4 is the transport layer, which provides an error-free, sequenced, guaranteed delivery, message service that allows process to process communication between stations on a network. Layer 5 is the session layer, which deals with the establishment of communications between applications. This layer is useful for security applications. Layer 6 is the presentation layer, which enables the sharing of data between networked systems using different methods of local data representation. Finally, Layer 7 is the application layer. This layer provides generic application functions, such as email, file transfer capability, and the like.

In SDH/SONET, APS provides port/line protection between nodes at a physical layer (i.e., Layer 1). Several topologies can support APS (i.e., ring, linear, or mesh topologies) and several levels of protection are possible (i.e., 1+1, N+1, and N:1). For the purpose of the following description, APS is illustrated using APS "1+1" configuration between nodes. N+1 and N:1 APS configurations can be supported by the same architecture. The APS "1+1" architecture generally arranges two lines or paths, with information propagating down each line or path at the same time. The connection can be bi-directional or unidirectional. In addition, the "1+1" architecture provides for a protect interface, or circuit, paired with each working interface, or circuit. Often, the protect and working circuits interface with an add/drop multiplexer, which sends the same traffic load to the working and protect circuits.

Within the protect circuit, information indicating the current status of the APS connection travels through the circuit continuously and conveys any requests for action. This information can be used to synchronize the working and protect circuits.

The present invention can support linear and ring protection, ring and mesh topology, and provides physical links, logical links, and path protection. However, for purposes of clarity in describing the invention, the description contained herein utilizes a linear APS configuration. One of ordinary skill in the art will appreciate that ring and mesh topology protection can also be implemented in accordance with aspects of the present invention. Path level (end-to-end) protection can also be supported by the architecture of the present invention by providing the appropriate source and destination Ethernet MAC addresses.

FIG. 1 shows the XGMII and XAUI relationship to the known IEEE 802.3 CSMA/CD LAN model, as well as the relationship of the RS and XGMII. FIG. 1 also shows the relationships of the XGMII, XGMII Extender, XGXS, and XAUI. The MAC Client or Higher Layers 134 can be, e.g., a network layer protocol, such as IP, or a forwarding function for switches. The Logical Link Control sublayer 132 provides the Data Link service (connectionless or connection-oriented) to the higher layer client, independent of the nature of the underlying Local Area Network (LAN). A MAC Control sublayer 130 supports all the currently defined MAC control frames, e.g., PAUSE frames, which prevent switches from unnecessarily discarding data frames due to input buffer overload. The MAC Control sublayer 130 is optional. A standard MAC sublayer 100, controls access to media.

Reconciliation Sublayers (RS) 102A, and 102B provide a mapping between the signals provided at the XGMII and the MAC/PLS service definition. XGMII 104A, 104B, and 104B 1 provide a simple, inexpensive, an easy-to-implement interconnection between the MAC sublayer and the PHY layer. The XAUI 122B can optionally be used to extend the operational distance of the XGMII with reduced pin count.

An XGMII Extender is transparent to the Reconciliation Sublayer 102A and 102B and PHY device, and operates symmetrically with similar functions on the Data Terminating Equipment (DTE) transmit and receive data paths. The optional XGMII Extender which is comprised of an XGXS 120B1 at the RS end (DTE XGXS), an XGXS 120B2 at the PHY end (PHY XGXS) and a XAUI 122B between them, is used to extend the operational distance of the XGMII and to reduce the number of interface signals. Applications include extending the physical separation that is possible between MAC and PHY components in a 10 Gigabit Ethernet system distributed across a circuit board.

A Physical Coding Sublayer (PCS) 106A, and 106B interface is the Media Independent Interface (XGMII) that provides a uniform interface to the Reconciliation sublayer 102A and 102B for all PHY implementations.

A Physical Medium Attachment (PMA) 108A, and 108B provides a medium-independent means for the PCS to support the use of a range of physical media. The PMA provides a Service Interface to the PCS. These services are described in an abstract manner and do not imply any particular implementation. The PMA 108A and 108B Service Interface supports the exchange of code-groups between PCS entities. The PMA converts code-groups into bits and passes these to the Physical Media Dependent (PMD), and vice versa. The PMA 108A and 108B also generates an additional status indication for use by its client.

A Physical Media Dependent (PMD) 110A, and 110B Service Interface supports the exchange of encoded and scrambled blocks between the PMA and PMD entities. The PMD translates the encoded data to and from signals suitable for the specified medium.

A Medium Dependent Interface (MDI) 112A, and 112B is the interface between the PMD and the cabling/medium 114A, and 114B.

Figure 2:
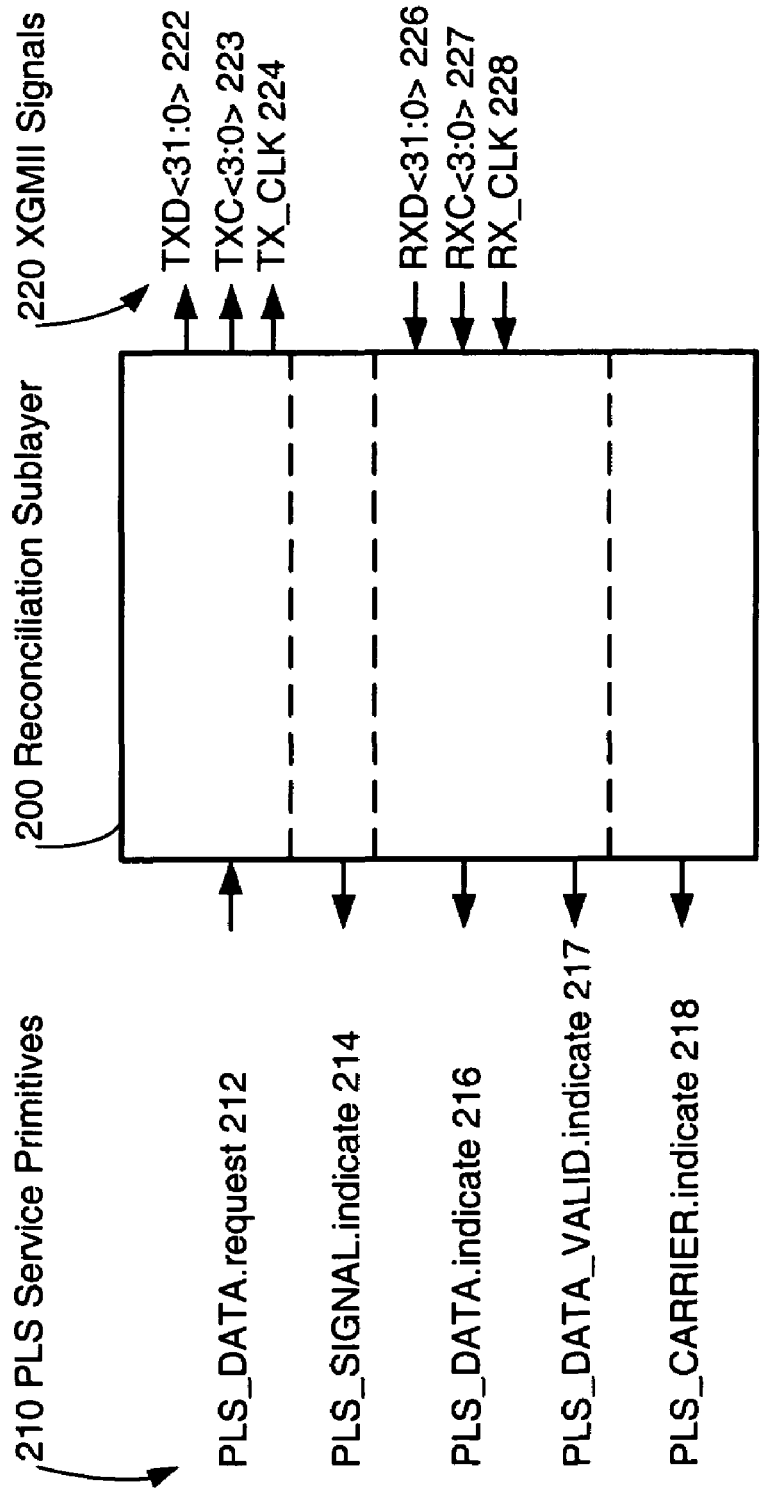
FIG. 2 is a diagrammatic illustration of the conventional Reconciliation Sublayer (RS) inputs and outputs as described in prior art.

FIG. 2 illustrates the schematic view of conventional Reconciliation sublayer 200 inputs and outputs. XGMII 220 is comprised of independent transmit 222, 223, and 224 and receive 226, 227, and 228 paths. Each direction uses 32 data signals (TXD<31:0> 222 and RXD<31:0> 226), four control signals (TXC<3:0> 223 and RXC<3:0> 227), and a clock (TX_CLK 224 and RX_CLK 228). The PLS Service Primitives 210 are comprised of PLS_Data.request 212, PLS_DATA.indicate 216, PLS_CARRIER.indicate 218, PLS_SIGNAL.indicate 214, and PLS_DATA_VALID.indicate 217.

The primitive PLS_DATA.request 212 maps to XGMII signals TXD<31:0> 222, TXC<3:0> 223, and TX_CLK 224. This primitive is generated by the MAC sublayer to request the transmission of a single data bit on the physical medium, or to stop transmission. In other interfaces like GMII and MII the primitive also maps to TX_EN, TX_ER, and the transmit path may be of four or eight data signals. These additional signals are dropped in XGMII because it is only defined for full duplex mode where these signals don't apply.

The primitive PLS_DATA.indicate 216 maps to the XGMII signals RXD<31:0> 226, RXC<3:0> 227 and RX_CLK 228. This primitive is generated to all MAC sublayer entities in the network after the PLS_DATA.request 212 is issued by the MAC at the remote end of the link connecting the two Data Terminating Equipments (DTE). In other interfaces like GMII and MII the primitive also maps to RX_ER and RX_DV signals. These additional signals are dropped in XGMII because it is only defined for full duplex mode where these signals don't apply.

The primitive PLS_CARRIER.indicate 218 in 10 Gb/s the RS never generates this primitive because of full duplex operation only. In other interfaces like GMII and MII the primitive maps to signal CRS. This primitive is generated by the RS whenever the CARRIER_STATUS parameter changes from CARRIER_ON to CARRIER_OFF, or vice versa.

The primitive PLS_SIGNAL.indicate 214 in 10 Gb/s the RS never generates this primitive because of full duplex operation only. In other interfaces like GMII and MII the primitive maps to signal COL. This primitive is generated by the RS whenever the SIGNAL_STATUS makes a transition from SIGNAL_ERROR to NO_SIGNAL_ERROR, or vice versa.

The primitive PLS_DATA_VALID.indicate 217 maps to the XGMII signals RXC<3:0> 227 and RXD<31:0> 226. This primitive is generated by the RS whenever the DATA_VALID_STATUS parameter changes from DATA_VALID to DATA_NOT_VALID, or vice versa.

The XGMII 220 is designed to make the difference among the various media and transceiver combinations transparent to the MAC sublayer.

XGMII transmit signal TX_CLK (transmit clock) 224 provides the timing reference for the transfer of the TXC<3:

0> 223 and TXD<31:0> 222 from the RS to the PHY. GMII and MII have similar signals.

XGMII transmit signal TXC<3:0> (transmit control) 223 indicates that the RS is presenting either data or control characters on the XGMII 220 for transmission. GMII and MII have a TX_EN signal, which is used in similar way.

XGMII transmit signal TXD<31:0> (transmit data) 222 is a bundle of 32 data signals that are driven by the RS. GMII and MII have similar signals of different pin size.

XGMII receive signal RX_CLK (receive clock) 228 provides the timing reference for the transfer of the RXC<3:0> 227 and RXD<31:0> 226 signals from the PHY to the RS. GMII and MII have similar signals.

XGMII receive signal RXC<3:0> (receive control) 227 indicate that the PHY is presenting either recovered and decoded data or control characters on the XGMII 220. GMII and MII have an RX_ER signal which, is used in similar way.

XGMII receive signal RXD<31:0> (receive data) 226 is a bundle of 32 data signals that are driven by the PHY. GMII and MII have similar signals of different pin size.

In GMII and MII CRS (carrier sense) signal is asserted by the PHY when either the transmit or receive medium is nonidle.

In GMII and MII COL (collision detected) signal is asserted by the PHY upon detection of a collision on the medium, and remains asserted while the collision condition persists.

In GMII and MII there additional Station Management signals. They are used to transfer control information and status between the PHY and the Station Management Entity (STA).

Figure 3:
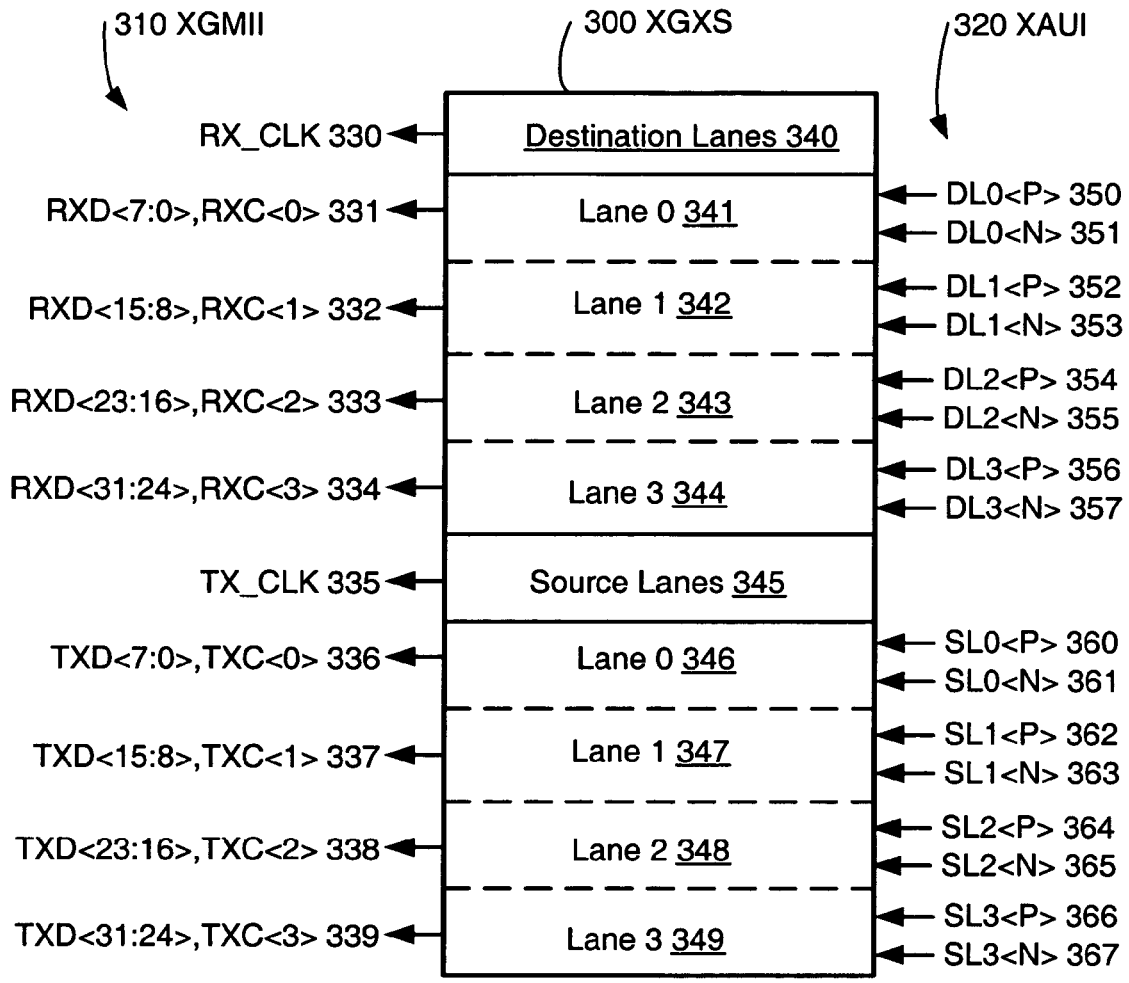
FIG. 3 is a diagrammatic illustration of the conventional XGXS inputs and outputs as described in prior art.

FIG. 3 illustrates a schematic representation of XGMII Extender Sublayer (XGXS) 300 inputs and outputs as defined in prior art. At the source side of a XAUI 320, the XGXS 300 takes XGMII 310 transmit data streams TXD<7:0>, TXC<0> 336, TXD<15:8>, TXC<1> 337, TXD<23:16>, TXC<2> 338, and TXD<31:24>, TXC<3> 339 striped over four source lanes 345 Lane 0 346, Lane 1 347, Lane 2 348 and Lane 3 349, and single-clock XGMII TX_CLK 335 as its input, maps XGMII 310 data and control characters into XAUI 320 code-groups, and encodes them for source transmission SL0<P> 360, SL0<N> 361, SL1<P> 362, SL1<N> 363, SL2<P> 364, SL2<N> 365, SL3<P> 366, and SL3<N> 367.

At the destination end of the XAUI 320, the XGXS 300 takes the XAUI destination receive DL0<P> 350, DL0<N> 351, DL1<P> 352, DL1<N> 353, DL2<P> 354, DL2<N> 355, DL3<P> 356, and DL3<N> 357, decodes the code-groups, deskews the four destination lanes 340 Lane 0 341, Lane 1 342, Lane 2 343, and Lane 3 344, compensates for clock rate disparity, and maps the XAUI 320 code-groups back into XGMII 310 data and control characters to recreate the XGMII 310 receive data streams RXD<7:0>, RXC<0> 331, RXD<15:8>, RXC<1> 332, RXD<23:16>, RXC<2> 333, and RXD<31:24>, RXC<3> 334. The destination XGXS 300 recovers clock and deskews four XAUI destination lanes 340 into the single-clock XGMII RX_CLK 330. Each XGXS 300 is bidirectional, having both source and destination functionality.

Figure 4:
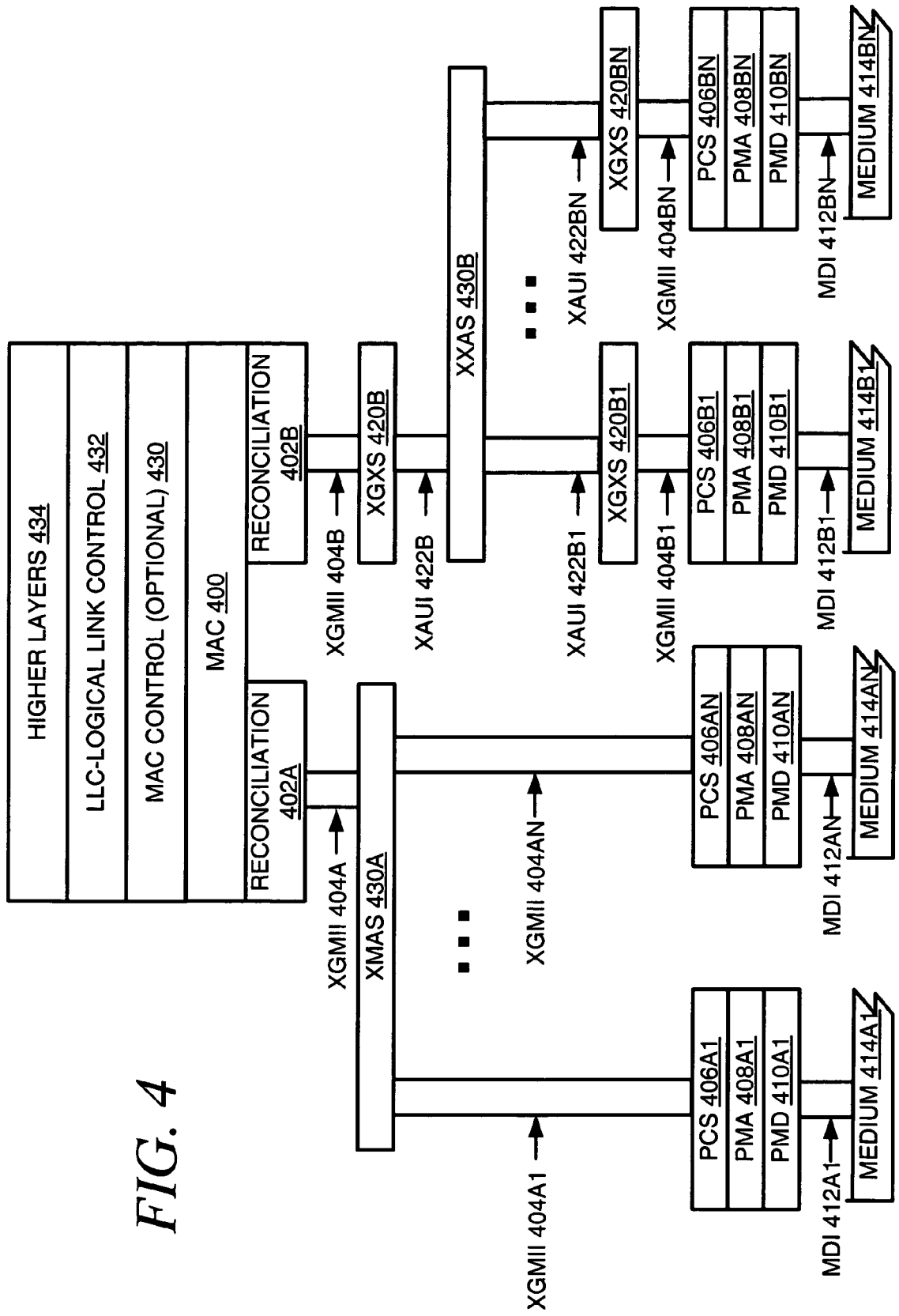
FIG. 4 is a diagrammatic illustration of Ethernet APS Bridge Selector Sublayers XMAS and XXAS relationship to the IEEE 802.3 CSMA/CD LAN Model, according to one embodiment of the present invention.

FIG. 4 shows Ethernet APS Bridge Selector Sublayers XMAS 430A and XXAS 430B relationship to the IEEE 802.3 CSMA/CD LAN model as defined by the present invention. FIG. 4 further shows the relationship of an XGMII 404A and 404B and the XMAS 430A, and the relationships of an XAUI 422B and the XXAS 430B. MAC Client or Higher Layers 434 can be, e.g., a network layer protocol, such as IP, or a forwarding function for switches. Logical Link Control sublayer 432 provides the Data Link service (connectionless or connection-oriented) to the higher layer client, independent of the nature of the underlying Local Area Network (LAN). MAC Control sublayer 430 supports all the currently defined MAC control frames, e.g., PAUSE frames, which prevent switches from unnecessarily discarding data frames due to input buffer overload. The MAC Control sublayer 430 is optional. A standard MAC sublayer 400, controls access to media.

Reconciliation Sublayers (RS) 402A, and 402B provide a mapping between the signals provided at the XGMII 404A and 404B and a MAC/PLS service definition. The XGMII 404A 404A1, 404AN, 404B, 404B1, and 404BN provides a simple, inexpensive, an easy-to-implement interconnection between the MAC sublayer and the PHY layer. The XAUI 422B, 422B1, and 422BN can optionally be used to extend the operational distance of the XGMII with reduced pin count.

The XGMII Extender is transparent to the Reconciliation Sublayer and PHY device, and operates symmetrically with similar functions on the Data Terminating Equipment (DTE) transmit and receive data paths. The optional XGMII Extender, which is comprised of an XGXS 420B at the RS end (DTE XGXS), an XGXS 420B1, and 420BN at the PHY end (PHY XGXS), and a XAUI 422B, 422B1, and 422BN between them, is used to extend the operational distance of the XGMII and to reduce the number of interface signals. Applications include extending the physical separation possible between MAC and PHY components in a 10 Gigabit Ethernet system distributed across a circuit board.

An X (X as in any; XGMII, GMII, MII, etc.) MII APS Sublayer (XMAS) is transparent to the Reconciliation Sublayer and the PHY device, and operates symmetrically with similar functions on the DTE transmit and receive data paths. The optional XMAS 430A, which is comprised of an XGMII 404A at the RS Side (DTE XGMII), and a plurality of XGMIIs 404A1 through 404AN at the PHY Side (PHY XGMII), is used to implement APS Bridge Selector functionality. For transmit, XGMII 404A can be bridged from XGMII 404A to any XGMIIs 404A1 through 404AN. Standard SDH/SONET APS requires support for up to fourteen working channels and one protect channel. GMII and MII have similar signals. One example APS embodiment has one working XGMII of a plurality of working XGMIIs and one protect XGMII being bridged. For receive, XGMII 404A can be selected by selector from one of XGMII 404A1 through 404AN to XGMII 404A. One example APS embodiment has one working XGMII of a plurality of working XGMIIs or one protect XGMII selected.

The XMAS is designed to make the difference among the various media and transceiver combinations transparent to the MAC sublayer. The XMAS is also designed to separate the bridge selector functionality outside the RS and/or the PHY because not every MAC or PHY needs to support Ethernet APS Bridge Selector functionality. An additional advantage of isolating the functionality in a separate optional sublayer between the RS and PHY is that a standard of the shelf MAC and PHY can be used with the XMAS to implement the Ethernet APS Bridge Selector functionality. In addition, not every MAC or PHY wants to incur the additional cost due to additional functionality.

An X (X as in any; XAUI, etc.) eXtender APS Sublayer (XXAS) is transparent to the Reconciliation Sublayer and the PHY device, and operates symmetrically with similar functions on the DTE transmit and receive data paths. The optional XXAS 430B, which is comprised of an XAUI 422B at the RS XGXS Side (DTE XAUI), and a plurality of XAUIs 422B1 through 422BN at the PHY XGXS Side (PHY XAUI), is used to implement APS Bridge Selector functionality. For transmit, XAUI 422B can be bridged from XAUI 422B to any XAUIs 422B1 through 422BN. Standard SDH/SONET APS requires support for up to fourteen working channels and one protect channel. GMII and MII have similar signal. One example APS embodiment has one working XAUI of a plurality of working XAUIs and one protect XAUI being bridged. For receive, XAUI 422B can be selected by selector from one of XAUI 422B1 through 422BN to XAUI 422B. One example APS embodiment has one working XAUI of a plurality of working XAUIs, or one protect XAUI being selected.

The XXAS is designed to make the difference among the various media and transceiver combinations transparent to the MAC sublayer. It is also designed to separate the bridge selector functionality outside the source XGXS and/or the destination XGXS because not every XGXS needs to support Ethernet APS Bridge Selector functionality. An additional advantage of isolating the functionality in a separate optional sublayer between the source and destination XGXS is that a standard of the shelf XGXS can be used with the XXAS to implement the Ethernet APS Bridge Selector functionality. In addition, not every MAC or XGXS or PHY wants to incur the additional cost due to additional functionality.

XMAS and XXAS can be used in various combinations (non nested and nested) of each other.

A Physical Coding Sublayer (PCS) 406A1, 406AN, 406B1 and 406BN interface is the Media Independent Interface (XGMII) that provides a uniform interface to the Reconciliation sublayer for all PHY implementations.

A Physical Medium Attachment (PMA) 408A1, 408AN, 408B1, and 408BN provides a medium-independent means for the PCS to support the use of a range of physical media. The PMA provides a Service Interface to the PCS. These services are described in an abstract manner and do not imply any particular implementation. The PMA Service Interface supports the exchange of code-groups between PCS entities. The PMA converts code-groups into bits and passes these to the Physical Media Dependent (PMD), and vice versa. It also generates an additional status indication for use by its client.

A Physical Media Dependent PMD) 410A1, 410AN, 410B1, and 410BN Service Interface supports the exchange of encoded and scrambled blocks between the PMA and PMD entities. The PMD translates the encoded data to and from signals suitable for the specified medium.

A Medium Dependent Interface (MDI) 412A1, 412AN, 412B1 and 412BN is the interface between the PMD and the cabling/medium 414A1, 414AN, 414B1, and 414BN.

One example embodiment in accordance with the present invention shows that the Bridge Selector functionality is implemented in separate sublayers. An alternative embodiment is to merge the XMAS sublayer functionality into the RS sublayer and the XAUI sublayer functionality into the XGXS sublayer. Another alternative embodiment can be to implement the Bridge Selector functionality in the PHY layer.

The illustrative embodiment of the present invention shows the Bridge Selector functionality using additional interfaces and signals. An alternative embodiment is to use, instead of signals, the available (currently reserved) control signals and/or the block encoding commands to implement the indicate to the corresponding sublayers of the appropriate Bridge Selector information/requests.

Figure 5:
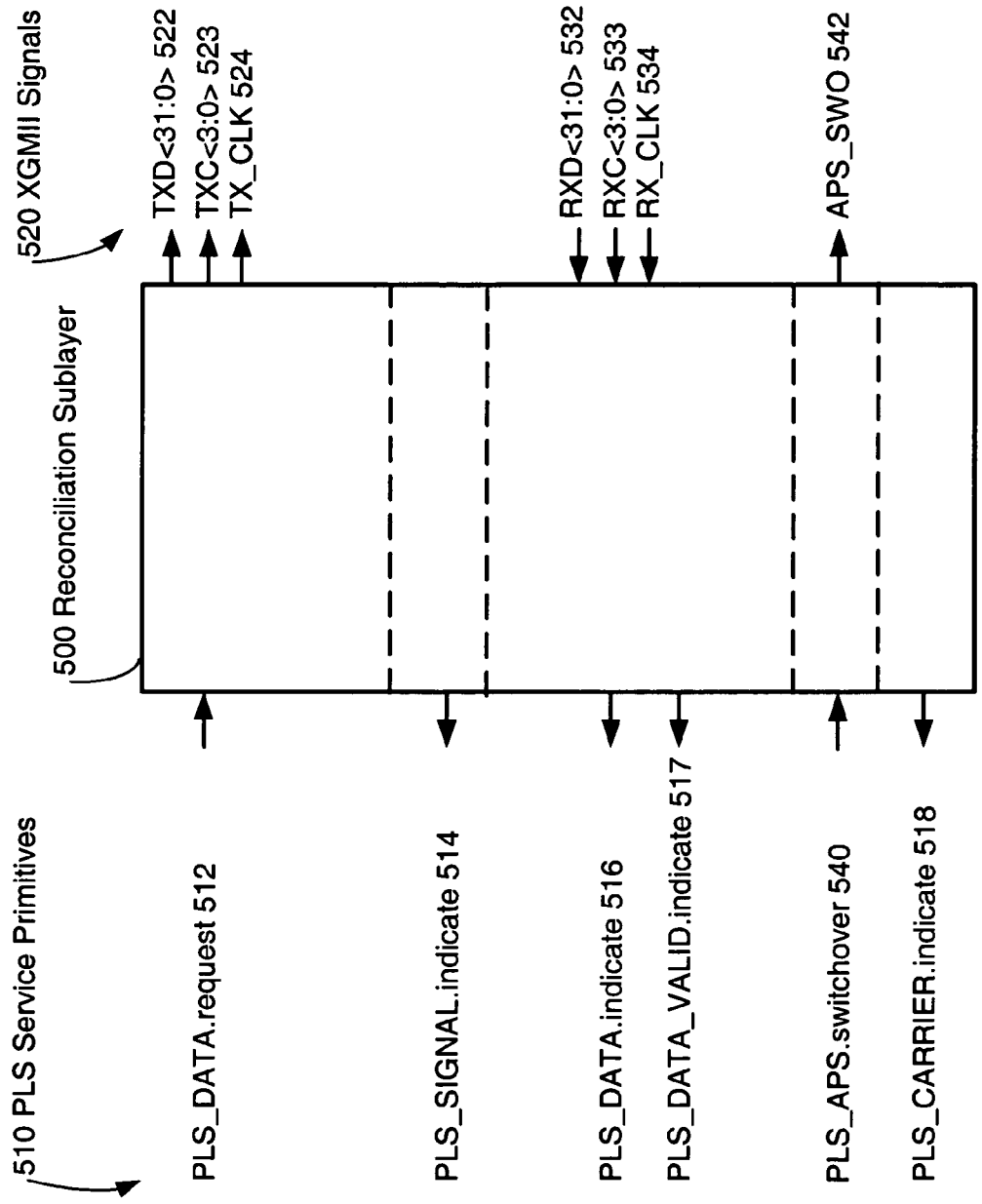
FIG. 5 is a diagrammatic illustration of Reconciliation Sublayer (RS) inputs and outputs according to one embodiment of the present invention.

FIG. 5 illustrates a schematic view of Reconciliation Sublayer 500 inputs and outputs. An XGMII 520 is comprised of independent transmit 522, 523, and 524 and receive 526, 527, and 528 paths. Each direction uses 32 data signals (TXD<31:0> 522 and RXD<31:0> 532), four control signals (TXC<3:0> 523 and RXC<3:0> 533), and clock (TX_CLK 524 and RX_CLK 534). The XGMII 520 also contains an optional APS (APS_SWO 542) signal. PLS Service Primitives 510 are comprised of PLS_Data.request 512, PLS_DATA.indicate 516, PLS_CARRIER.indicate 518, PLS_SIGNAL.indicate 514, and PLS_DATA_VALID.indicate 517. The PLS Service Primitives 510 also contains optional APS primitive PLS_APS.switchover 540.

A primitive PLS_DATA.request 512 maps to XGMII signals TXD<31:0> 522, TXC<3:0> 523, and TX_CLK 524. This primitive is generated by the MAC sublayer to request the transmission of a single data bit on the physical medium or to stop transmission. In other interfaces, such as GMII and MII, the primitive also maps to TX_EN, TX_ER, and the transmit path may be of four or eight data signals. These additional signals are dropped in XGMII because it is only defined for full duplex mode where these signals don't apply.

A primitive PLS_DATA.indicate 516 maps to the XGMII signals RXD<31:0> 532, RXC<3:0> 533 and RX_CLK 534. This primitive is generated to all MAC sublayer entities in the network after a PLS_DATA.request is issued by the MAC at the remote end of the link connecting the two Data Terminating Equipments (DTE). In other interfaces, such as GMII and MII, the primitive also maps to RX_ER and RX_DV signals. These additional signals are dropped in XGMII because it is only defined for full duplex mode where these signals don't apply.

A primitive PLS_CARRIER.indicate 518 in 10 Gb/s the RS never generates this primitive because of full duplex operation only. In other interfaces, such as GMII and MII, the primitive maps to signal CRS. This primitive is generated by the RS whenever the CARRIER_STATUS parameter changes from CARRIER_ON to CARRIER_OFF, or vice versa.

A primitive PLS_SIGNAL.indicate 514 in 10 Gb/s the RS never generates this primitive because of full duplex operation only. In other interfaces, such as GMII and MII, the primitive maps to signal COL. This primitive is generated by the RS whenever the SIGNAL_STATUS makes a transition from SIGNAL_ERROR to NO_SIGNAL_ERROR or vice versa.

A primitive PLS_DATA_VALID.indicate 517 maps to the XGMII signals RXC<3:0> 527 and RXD<31:0> 526. This primitive is generated by the RS whenever the DATA_VALID_STATUS parameter changes from DATA_VALID to DATA_NOT_VALID or vice versa.

The present invention extends the PLS interface with the optional primitive PLS_APS.switchover 540, which maps to the optional XGMII signal APS_SWO 542. This primitive is generated by the MAC sublayer to request a switchover from active channel to standby channel or vice versa. Note that either working or protect can be active depending on the current state of the selector. The PLS_APS.switchover 540 can take an optional CHANNEL_NUMBER parameter to request a particular channel to switch to.

The XGMII is designed to make the difference among the various media and transceiver combinations transparent to the MAC sublayer.

XGMII transmit signal TX_CLK (transmit clock) 524 provides the timing reference for the transfer of the TXC<3:0> 523 and TXD<31:0> 522 from the RS to the PHY.

XGMII transmit signal TXC<3:0> (transmit control) 523 indicates that the RS is presenting either data or control characters on the XGMII for transmission. GMII and MII have TX_EN signal which is used in similar way.

XGMII transmit sisal TXD<31:0> (transmit data) 522 is a bundle of 32 data signals that are driven by the RS. GMII and Mu have similar signal of different pin size.

XGMII receive signal RX_CLK (receive clock) 534 provides the timing reference for the transfer of the RXC<3:0> 533 and RXD<31:0> 532 signals from the PHY to the RS. GMII and Mu have similar signal.

XGMII receive signal RXC<3:0> (receive control) 533 indicate that the PHY is presenting either recovered and decoded data or control characters on the XGMII. GMII and MII have RX_ER signal which is used in similar way.

XGMII receive signal RXD<31:0> (receive data) 532 is a bundle of 32 bit data signals that are driven by the PHY. GMII and Mu have similar signal of different pin size.

The present invention extends the XGMII with optional XMGII APS signal APS_SWO (switchover channel) 542, which indicates that the RS layer is requesting a channel switchover for the PHY. The signal can be implemented as an edge or pulse signal. Implementing the signal as an edge allows for the working or protect state to be easily determined during debugging. When APS_SWO is asserted for one or more clock periods the PHY switches over from active to standby channel. Note that either working or protect can be active depending on the current state of the selector. The APS_SWO 542 signal allows for various MAC sublayers to request a switchover within 50 ms. The APS_SWO 540 can be an optional CHANNEL_NUMBER to request a particular channel to switch to. This can be implemented as a multi bit APS_SWO signal based on the size of the channel number supported.

In GMII and MII CRS (carrier sense) signal is asserted by the PHY when either transmit or receive medium is non-idle.

In GMII and MII COL (collision detected) signal is asserted by the PHY upon detection of a collision on the medium, and remains asserted while the collision condition persists.

In GMII and MII there additional Station Management signals. The signals are used to transfer control information and status between the PHY and the Station Management Entity (STA).

The allocation of the functions at the RS and XGMII balances the need for media independence with the need for a simple and cost-effective interface. The RS and XGMII can be extended with additional APS primitives such as PLS_APS.bridge(ON|OFF), PLS_APS.selector(ON|OFF), PLS_APS.working(CHANNEL_NUMBER), PLS_APS.protect(CHANNEL_NUMBER), and the like. There can also be additional APS Station Management signals. The signals are used to transfer control information and status between the XGMII and the Station Management Entity (STA).

Figure 6:
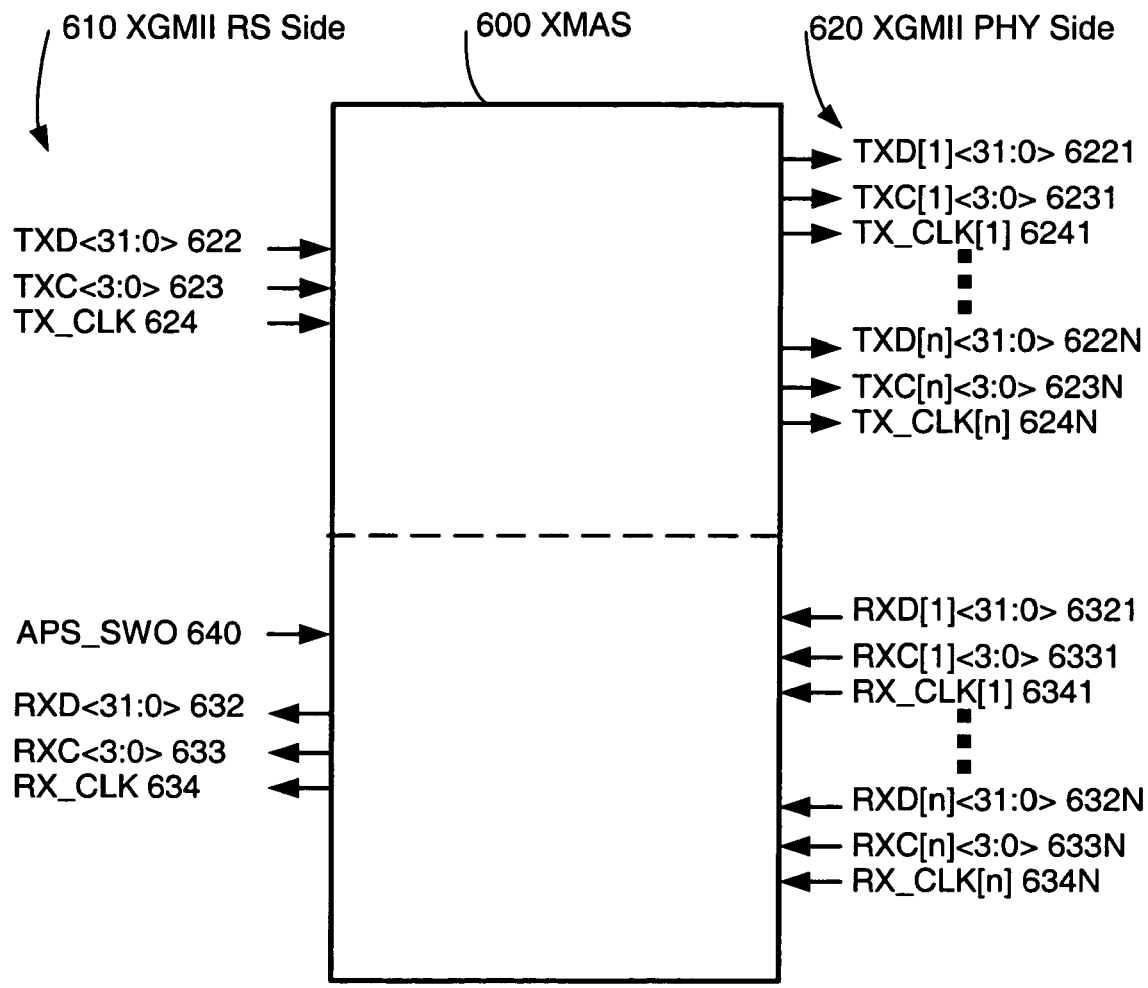
FIG. 6 is a diagrammatic illustration of XMAS inputs and outputs according to one embodiment of the present invention.

FIG. 6 illustrates one example of the schematic view of the XMAS 600 inputs and outputs. The XMAS RS Side or source side 610 is comprised of independent transmit 622, 623, and 624 and receive 626, 627, and 628 paths. In addition there is an optional APS input 640. Each direction uses 32 data signals (TXD<31:0> 622 and RXD<31:0> 632), four control signals (TXC<3:0> 623 and RXC<3:0> 633), and clock (TX_CLK 624 and RX_CLK 634). The XGMII RS Side 610 also contains an optional APS (APS_SWO 640) signal.

The XMAS PHY Side or destination side 620 is comprised of a plurality of independent transmit 6221, 6231, and 6241 through 622N, 623N, and 624N and receive 6321, 6331, and 6341 through 632N, 633N, and 634N channels or paths. Each direction uses 32 data signals (TXD[1]<31:0> 6221, TXD[n]<31:0> 622N, RXD[1]<31:0> 6321 and RXD [n]<31:0> 632N), four control signals (TXC[1]<3:0> 6231, TXC[n]<3:0> 623N, RXC[1]<3:0> 6331, and RXC[n]<3:0> 633N), and clock (TX_CLK[1] 6241, TX_CLK[n] 624N, RX_CLK[1] 6341 and RX_CLK[n] 634N), where "n" is the number of channels. Standard SDH/SONET APS requires support for up to fourteen working channels and one protect channel. GMII and MII have similar signals.

Based on the Bridge state the source/input XGMII RS Side signals TXD<31:0> 622, TXC<3:0> 623, and TX_CLK 624 are bridged to a plurality of destination/output XGMII PHY Side signals TXD[1]<31:0> 6221, TXC[1]<3:0> 6231, and TX_CLK[1] 6241 through TXD[1]<31:0> 622N, TXC [1]<3:0> 623N, and TX_CLK[1] 624N. The signals can be bridged to one or more output channels. One example embodiment for Standard SDH/SONET APS is to have bridging of two output channels, one working channel and one protect channel.

Based on the Selector state from a plurality of destination/output XGMII PHY Side signals RXD[1]<31:0> 6321, RXC[1]<3:0> 6331, and RX_CLK[1] 6341 through RXD [n]<31:0> 632N, RXC[n]<3:0> 633N, and RX_CLK[n] 634N one channel is selected to switch to the source/input XGMII RS Side signals RXD<31:0> 632, RXC<3:0> 633, and RX_CLK 634. One example embodiment for Standard SDH/SONET APS is to have selected one of the working channels or the protect channel.

XGMII RS Side transmit signal TX_CLK (transmit clock) 624 provides the timing reference for the transfer of the TXC<3:0> 623 and TXD<31:0> 622 from the RS to the PHY. A plurality of such XGMII PHY Side transmit signals TX_CLK[1] 6241 through TX_CLK[n] 624N provides the timing reference for the transfer of the TXC[1]<3:0> 6231 and TXD[1<31:0> 6221 through TXC[n]<3:0> 623N, and TXD[n]<31:0> 622N from the RS to the PHY.

XGMII RS Side transmit signal TXC<3:0> (transmit control) 623 indicate that the RS is presenting either data or control characters on the XGMII for transmission. A plurality of such XGMII PHY Side transmit signals TXC[1]<3:0> 6231 through TXC[n]<3:0> 623N can be supported. GMII and MII have TX_EN signal which is used in similar way.

XGMII RS Side transmit signal TXD<31:0> (transmit data) 622 is a bundle of 32 data signals that are driven by the RS. A plurality of such XGMII PHY Side transmit signals TXD[n]<31:0> 6221 through TXD[n]<31:0> 622N can be supported. GMII and MII have similar signal of different pin size.

XGMII RS Side receive signal RX_CLK (receive clock) 634 provides the timing reference for the transfer of the RXC[1]<3:0> 6331, RXC[n]<3:0> 633N, RXD[1]<31:0> 6321, and RXD[n]<31:0> 632N signals from the PHY to the RS. A plurality of such XGMII PHY Side receive signals RX_CLK[1] 6341, through RX_CLK[n]<3:0> 634N can be supported. GMII and MII have similar signals.

XGMII RS Side receive signal RXC<3:0> (receive control) 633 indicate that the PHY is presenting either recovered and decoded data or control characters on the XGMII. A plurality of such XGMII PHY Side receive signals RXC[1] <3:0> 633 through RXC[n]<3:0> 633N can be supported. GMII and MII have RX_ER signal which is used in similar way.

XGMII RS Side receive signal RXD<31:0> (receive data) 632 is a bundle of 32 bit data signals that are driven by the PHY. A plurality of such XGMII PHY side receive signals RXD[1]<31:0> 6321 through RXD[n]<31:0> 632N can be supported. GMII and MII have similar signal of different pin size.

In GMII and MII CRS (carrier sense) signal is asserted by the PHY when either transmit or receive medium is non-idle.

In GMII and MII COL (collision detected) signal is asserted by the PHY upon detection of a collision on the medium, and remains asserted while the collision condition persists.

The XMAS RS Side APS signal APS_SWO (switchover channel) 640 indicates that the RS layer is requesting the XMAS 600 for a channel switchover of the receiving PHY channel. The signal can be implemented as an edge or pulse signal. Implementing the signal as an edge allows for the working or protect state to be easily determined during debugging. When APS_SWO is asserted for one or more clock periods the PHY switches over from active to working channel. Note that either working or protect can be active depending on the current state of the selector. The XMAS RS Side APS_SWO APS signal can be optionally passed through the XMAS sublayer to the XMAS PHY Side in case of support for nested XGMII or XAUI or other interface or sublayers. The APS_SWO 640 signal allows for various MAC Clients or MAC sublayers to request a switchover within 50 ms. The APS_SWO 640 can be an optional CHANNEL_NUMBER to request a particular channel for switching. This can be implemented as a multi bit APS_SWO signal based on the size of the channel number supported.

The allocation of the functions at the XMAS balances the need for media independence with need for a simple and cost-effective interface. The XMAS can be extended with additional APS signals to support PLS primitives such as PLS_APS.bridge(ON|OFF), PLS_APS.selector(ON|OFF), PLS_APS.working(CHANNEL_NUMBER), PLS_APS.protect(CHANNEL_NUMBER) etc. There can also be additional Station Management signals. They are used to transfer control information and status between the XMAS and the Station Management Entity (STA). If the XMAS and XXAS can be cascaded or daisy chained together then there can be an additional output signal to pass through the APS_SWO or other signals appropriately to the subsequent XMAS or XXAS.

Figure 7:
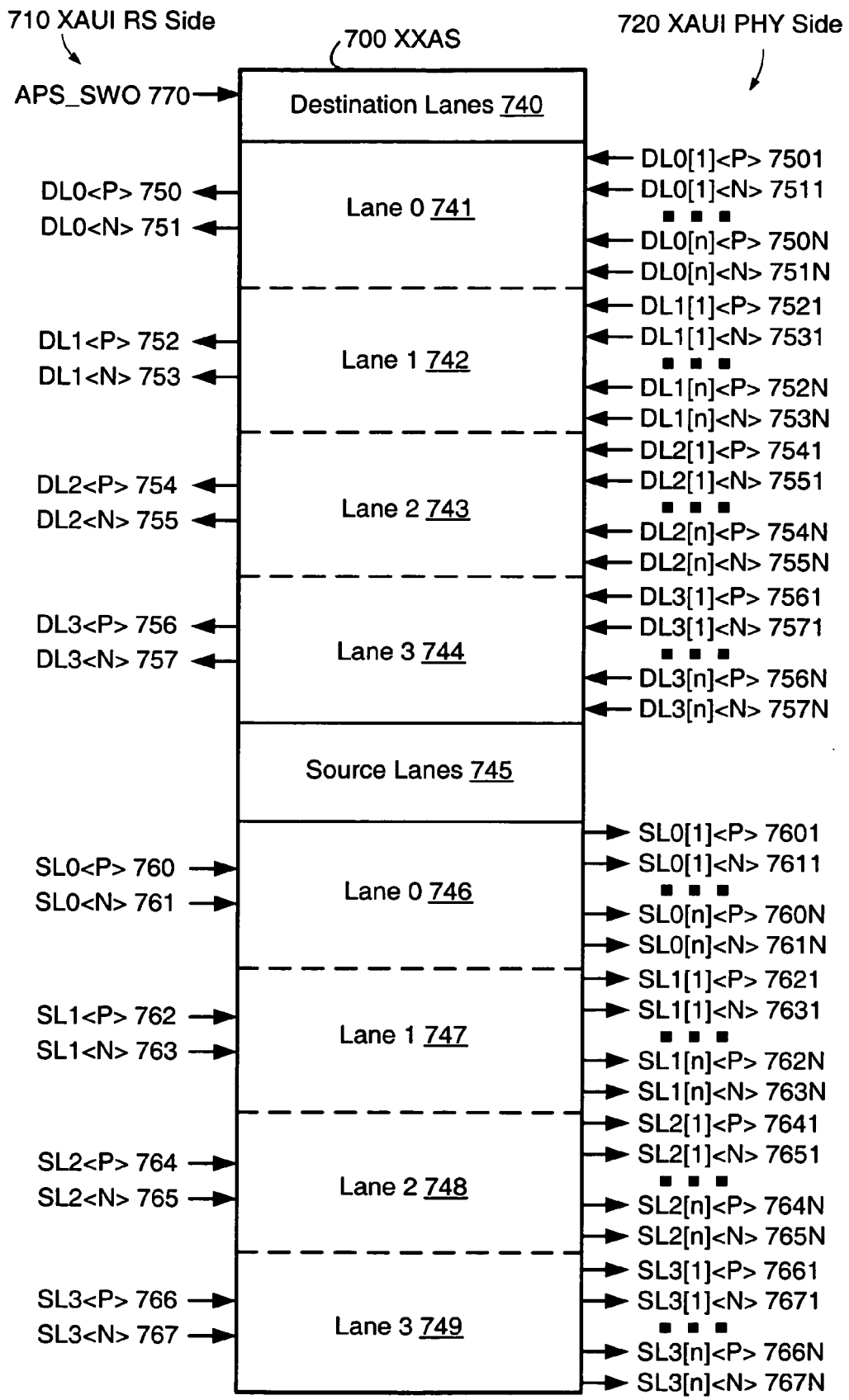
FIG. 7 is a diagrammatic illustration of XXAS inputs and outputs according to one embodiment of the present invention.

FIG. 7 illustrates a schematic view of XXAS 700 inputs and outputs. An XAUI RS Side or XGXS Side or source side 710 is comprised of four source lanes 745 Lane 0 746, Lane 1 747, Lane 2 748, and Lane 3 749 with RS Side transmission signals SL0<P> 760, SL0<N> 761, SL1<P> 762, SL1<N> 763, SL2<P> 764, SL2<N> 765, SL3<P> 766, and SL3<N> 767. The XGXS RS Side 710 also contains an optional APS (APS_SWO 640) signal. The XAUI RS side or source side 710 also comprised of four destination lanes 740 Lane 0 741, Lane 1 742, Lane 2 743, and Lane 3 744 with RS Side receive signals DL0<P> 750, DL0<N> 751, DL1<P> 752, DL1<N> 753, DL2<P> 754, DL2<N> 755, DL3<P> 756, and DL3<N> 757.

The XXAS PHY side or destination side 720 is comprised of four source lanes 745, each lane comprised of a pluralities of independent transmit signals. Lane 0 746 is comprised of a plurality of transmit signals SL0[1]<P> 7601 and SL0[1]<N> 7611 through SL0[n]<P> 760N and SL0[n]<N> 761N. Lane 1 747 is comprised of a plurality of transmit signals SL1[1]<P> 7621 and SL1[1]<N> 7631 through SL1[n]<P> 762N and SL1[n]<N> 763N. Lane 2 748 is comprised of a plurality of transmit signals SL2[1]<P> 7641 and SL2[1]<N> 7651 through SL2[n]<P> 764N and SL1[n]<N> 765N. Lane 3 749 is comprised of a plurality of transmit signals SL3[1]<P> 7661 and SL3[1]<N> 7671 through SL3[n]<P> 766N and SL3[n]<N> 767N, where "n" is the number of channels. Standard SDH/SONET APS requires support for up to fourteen working channels and one protect channel. GMII and MII have similar signals.

Based on the Bridge state the source/input XXAS RS or XGXS Side signals SL0<P> 760, SL0<N> 761, SL1<P> 762, SL1<N> 763, SL2<P> 764, SL2<N> 765, SL3<P> 766, and SL3<N> 767 are bridged to a plurality of destination/output XAUI PHY Side signals SL0[1]<P> 7601, SL0[1]<N> 7611, SL1[1]<P> 7621, SL1[1]<N> 7631, SL2[1]<P> 7641, SL2[1]<N> 7651, SL3[1]<P> 7661, and SL3[1]<N> 7671 through SL0[n]<P> 760N, SL0[n]<N> 761N, SL1[n]<P> 762N, SL1[n]<N> 763N, SL2[n]<P> 764N, SL2[n]<N> 765N, SL3[n]<P> 766N, and SL3[n]<N> 767N. The signals can be bridged to one or more output channels. One example embodiment for Standard SDH/SONET APS is to have bridging of two output channels, one working channel and one protect channel.

The XXAS PHY side or destination side 720 is comprised of four destination lanes 740, each lane comprised of a pluralities of independent receive signals. Lane 0 741 is comprised 5 of a plurality of receive signals DL0[1]<P> 7501 and DL0[1]<N> 7511 through DL0[n]<P> 750N and DL0[n]<N> 751N. Lane 1 742 is comprised of a plurality of receive signals DL1[1]<P> 7521 and DL1[1]<N> 7531 through DL1[n]<P> 752N and DL1[n]<N> 753N. Lane 2 743 is comprised of a plurality of receive signals DL2[1]<P> 7541 and DL2[1]<N> 7551 through DL2[n]<P> 754N and DL1[n]<N> 755N. Lane 3 744 is comprised of a plurality of receive signals DL3[1]<P> 7561 and DL3[1]<N> 7571 through DL3[n]<P> 756N and DL3[n]<N> 757N.

Based on the Selector state from a plurality of destination/output XAUI PHY Side signals DL0[1]<P> 7501, DL0[1]<N> 7511, DL1[1]<P> 7521, DL1[1]<N> 7531, DL2[1]<P> 7541, DL2[1]<N> 7551, DL3[1]<P> 7561, and DL3[1]<N> 7571 through DL0[n]<P> 750N, DL0[n]<N> 751N, DL1[n]<P> 752N, DL1[n]<N> 753N, DL2[n]<P> 754N, DL2[n]<N> 755N, DL3[n]<P> 756N, and DL3[n]<N> 757N one channel is selected to switch to the source/input XXAS RS or XGXS Side signals SL0<P> 760, SL0<N> 761, SL1<P> 762, SL1<N> 763, SL2<P> 764, SL2<N> 765, SL3<P> 766, and SL3<N> 767. One example embodiment for Standard SDH/SONET APS is to have a selected one of the working channels or the protect channel.

The present invention extends the XAUI with optional XAUI APS source signal APS_SWO (switchover channel) 770, which indicates that the RS or XGXS is requesting the XXAS 700 for a channel switchover of the receiving PHY channel. The signal can be implemented as an edge or pulse signal. Implementing the signal as an edge allows for the working or protect state to be easily determined during debugging. When APS_SWO is asserted for one or more clock periods the PHY switches over from active to working channel. Note that either working or protect can be active depending on the current state of the selector. The APS_SWO source signal can be optionally passed through the XXAS sublayer in case of support for nested XGMII or XAUI or other interface or sublayers. The APS_SWO 770 signal allows for various MAC Clients or MAC sublayers to request a switchover within 50 ms. The APS_SWO 770 can be an optional CHANNEL_NUMBER to request a particular channel to switch to. This can be implemented as a multi bit APS_SWO signal based on the size of the channel number supported.

The allocation of the functions at the XXAS balances the need for media independence with need for a simple and cost-effective interface. The XXAS can be extended with additional APS signals to support PLS primitives such as PLS_APS.bridge(ON|OFF), PLS_APS.selector(ON|OFF), PLS_APS.working(CHANNEL_NUMBER), PLS_APS.protect(CHANNEL_NUMBER) etc. There can also be additional Station Management signals. They are used to transfer control information and status between the XXAS and the Station Management Entity (STA). If the XMAS and XXAS can be cascaded or daisy chained together then there can be an additional output signal to pass through the APS_SWO or other signals appropriately to the subsequent XMAS or XXAS.

Figure 8A:
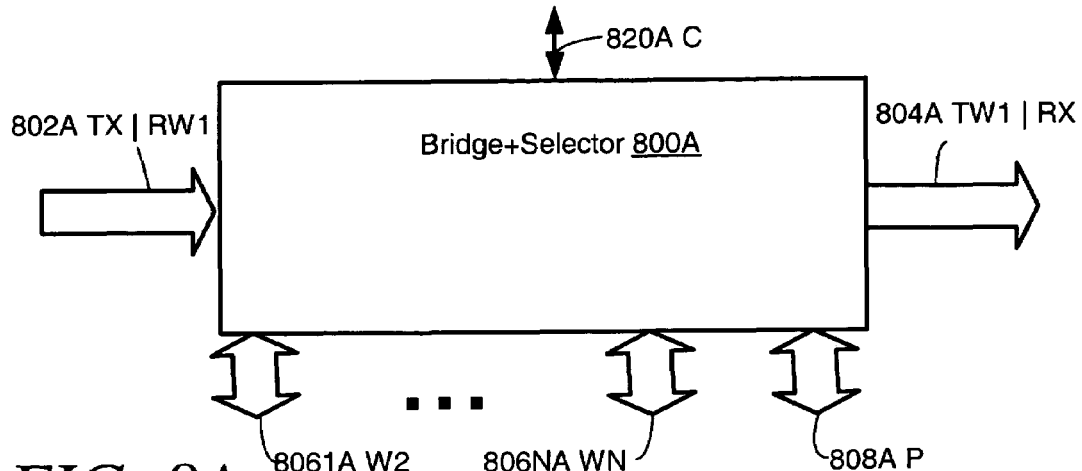
FIGS. 8A, 8B, and 8C are diagrammatic illustrations of Ethernet APS Bridge Selector Operation according to one embodiment of the present invention.
Figure 8B:
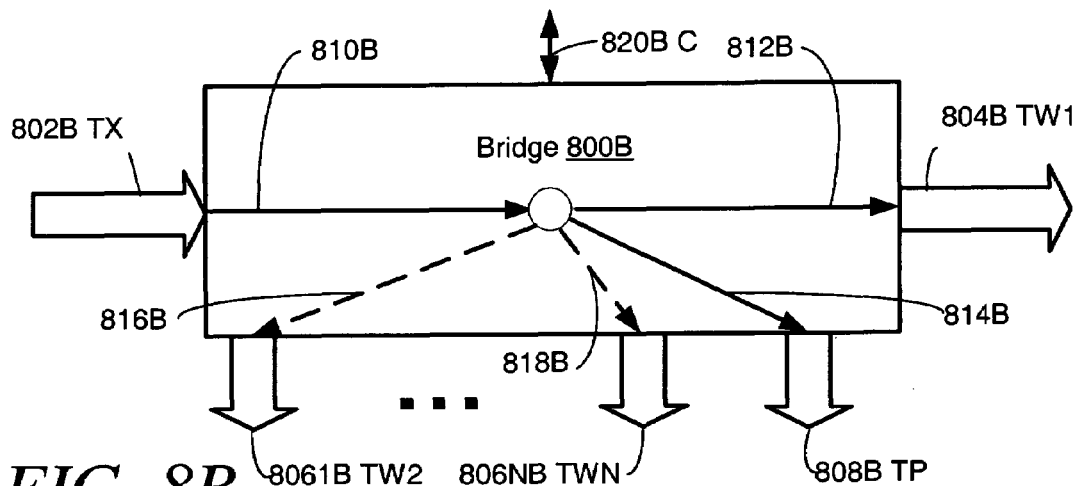
Figure 8C:
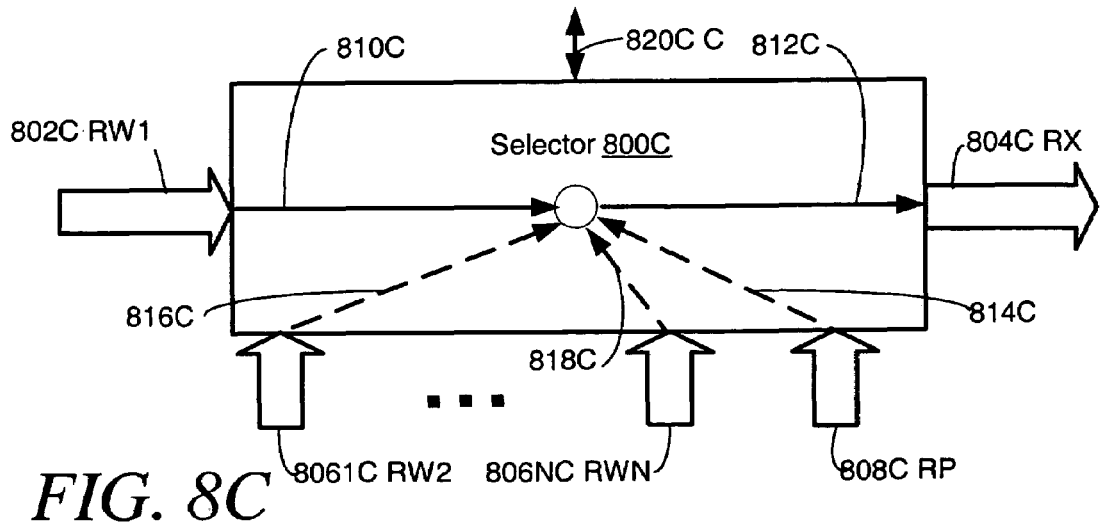

FIGS. 8A, 8B, and 8C illustrate one example implementation of the Ethernet APS Bridge Selector Operations. An Ethernet APS Bridge Selector device 800A can implement XMAS or XXAS. The Ethernet APS Bridge Selector device 800A can be implemented such that it takes an input interface (XGMII or XAUI) 802A and an output interface (XGMII or XAUI) 804A. There are a plurality of input or output interfaces (XGMII or XAUI) 8061A through 806NA, and 808A, where "N" is the number of working channels supported. The interfaces can be bidirectional (receive and transmit signals) or unidirectional (receive or transmit signals).

In addition, the Ethernet APS Bridge Selector device 800A has a control interface 820A for register access and other functionality required to manage the device by a processor or other hardware or software entities. Hardware can include MAC Client, OAMP Client, MAC Control sublayer, MAC APS Control sublayer, and/or MAC OAMP Control sublayer. Software can include APS Controller and/or OAMP software. The control interface 820A allows for APS Controller, OAMP Client or other software to request a switchover within 50 ms.

The Ethernet APS Bridge Selector device 800A can be configured using the registers to be in a bridge or selector mode. Physically any interface can be configured to be a working or protect interface. In bridge mode, the working interface channel is bridged along with the protect interface. In selector mode, the working interface channel or the protect interface is selected. The register can be used to enable and disable bridging, selector, and switchover. The registers can allow for various other configuration setups such as, which channels to bridge, which channels to be working and which channel to be protect, whether to be revertive or non-revertive, and the like. The registers can also have various counters needed to provide management and diagnostics visibility.

In the context of ring networks, the Ethernet APS Bridge Selector device 800A can be configured in bridge mode to provide drop and continue functionality to support ring protection, ring interworking, and ring interconnections.

The Ethernet APS Bridge Selector operation as shown in FIG. 8BE, shows the case of the Ethernet APS Bridge Selector configured in bridge mode 800B. In this mode a transmit is interfaced to an input interface transmit TX 802B and the transmit signals bridge to a plurality of an output interfaces transmit working TW1 804B, TW2 8061B through TWN 806NB, and transmit protect TP 808B. The solid line arrows represent active traffic, while the dashed line arrows represent standby traffic. In the case shown transmit signals 810B from a TX 802B are being bridged 812B, and 814B to a working TW1 804B and a protect TP 808B channels. A plurality of signals 816B, and 818B are in standby. Typically the input interface TX 802B is connected to a RS. The plurality of output interfaces TW1 804B, TW2 8061B through TWN 806NB, and TP 808B is connected to a plurality of PHYs. The Bridge can be configured to be in pass through mode also where the input interface TX 802B can be pass through without bridging to any one of the plurality of output interfaces TW1 804B, TW2 8061B through TWN 806NB, and TP 808B. Typically in pass through mode the input interface transmit TX 802B is connected to the output interface transmit protect TP 808B.

The Ethernet APS Bridge Selector can support drop and continue functionality for ring networks in bridge mode 800B. The ingress ring interface can be connected to the input interface TX 802B, the drop can be connected to a plurality of an output interfaces transmit working TW1 804B, TW2 8061B through TWN 806NB, and transmit protect TP 808B. The continue can be connected to output interface TW1 804B, which can be the egress ring interface.

In addition, the Ethernet APS Bridge Selector device 800B has control interface C 820B for register access and other functionality required to manage the device by a processor or other hardware or software entities.

The Ethernet APS Bridge Selector operation as shown in FIG. 8C, shows the case of the Ethernet APS Bridge Selector configured in selector mode 800C. In this mode receive is interfaced to an output interface receive RX 804C and the receive signals are selected from a plurality of input interfaces receive working RW1 802C, RW2 8061C through RWN 806NC, and receive protect RP 808C. The solid line arrows represent active traffic, while the dashed line arrows represent standby traffic. In the case shown, receive signals 810C from RX 802C are selected 812C. A plurality of signals 816C, 818C, and 814C are in standby. Typically the output interface RX 804C is connected to a RS. The plurality of input interfaces RW1 802C, RW2 8061C through RWN 806NC, and RP 808C are connected to a plurality of PHYs. The selector can be configured to be pass through mode also where any of the input interfaces RW1 802C, RW2 8061C through RWN 806NC, and RP 808C can pass through without selection to the input interface RX 804C. Typically in pass through the input interface receive protect RP 808C is connected to the output interface receive RX 804C. One example embodiment of the Ethernet APS Bridge Selector has multiple receive input interfaces multiplexed into one receive output interface.

In addition, the Ethernet APS Bridge Selector device 800C has control interface C 820C for register access and other functionality required to manage the device by a processor or other hardware or software entities.

When a failure or defect is detected on the active channel the MAC Client or MAC sublayers can request a switchover using the provided APS signal. The switchover causes the selector to switch from the active channel to the standby channel. The MAC Client or MAC sublayers or APS controller or OAMP Client or OAMP software can also get requests for switchover by APS or OAMP control frames and cause a switchover. When a failure or defect is detected via an interrupt or register status poll the MAC Clients or MAC Sublayers or MAC Client or any other hardware can request the switchover using the APS signal. When a failure or defect is detected via an interrupt or register status poll the APS controller or OAMP software or any other software can request the switchover using the control interface by setting appropriate register values. The APS signal and register access allow the switchover event to be processed and the switchover requested within 50 ms. An alternative embodiment provides switchover to a specified optional channel number.

In accordance with one example embodiment of the present invention, unidirectional interfaces are provided. An alternative implementation is to support bidirectional interfaces. Based on the configured Bridge or Selector mode the Ethernet APS Bridge Selector device 800A that is in the interface can be receiving or transmitting part of the XGMII or XAUI. This has advantage of reducing the pin count and the routes on the printed circuit board and backplane. This is possible because a particular port can be configured to be either a working or protect port at one time.

When a port is configured as working and is active, the transmit is bridged using the transmit bridge selector device in bridge mode to the protect port where its transmit bridge selector device is in selector pass through mode. The active working port's receive is selected using the receive bridge selector device in selector mode and the receive of the protect port where its receive bridge selector device is in bridge pass through mode. When the protect port becomes active the described situation reverses.

Typically the transmit protect of the transmit bridge selector in bridge mode of the working port is connected to the receive protect of the transmit bridge selector in selector pass through mode of protect port. The transmit protect of the receive bridge selector in bridge pass through mode of the protect port is connected to the receive protect of the receive bridge selector in selector mode of the working port. When the protect port becomes active the described situation reverses.

To reduce costs, the Ethernet APS Bridge Selector device can also be implemented with support N=1 for just 1:1 or 1+1 protection which is much more common than 1:n. This can also support Ring Protection. An alternative implementation is to support N>=1, such as N=14 for Standard SDH/SONET APS support. The Bridge operation is not restricted to only two output interfaces. The Selection operation is not restricted to only one input interfaces.

The Ethernet APS Bridge Selector device can be implemented such that the same device can be in XGMII or XAUI or any other interconnect interface mode based on configuration.

The Ethernet APS Bridge Selector chip can be packaged with two Ethernet APS Bridge Selector devices because usually ports are bidirectional. Each device can be independently configured to be in Bridge or Selector mode. For board real estate and cost purposes an Ethernet APS Bridge Selector chip can have as many Ethernet APS Bridge Selector devices as needed.

The present invention maintains several advantages. Because it does not change the Ethernet framing it is backward compatible and conforms to the Ethernet Standards. Because it optionally modifies the Ethernet Reconciliation Sublayer, XGXS, XGMII, and/or XAUI (or other RS to PHY interconnect interfaces) vendors can choose whether to implement the functionality of the present invention. The elegant design and configuration of the invention makes implementation in the Ethernet APS Bridge Selector hardware relatively easy. The method of the present invention is modular and isolated from the Ethernet MAC, Reconciliation, XGXS, and PHY sublayers. Therefore, the apparatus of the present invention has simple optional modifications to existing RS, XGMII (or other MII interfaces), and XAUI. Because it reuses standard SDH/SONET APS definitions and process, the implementation of the present invention is fully compliant with the SDH/SONET standard protocol. Because it supports register access for MAC clients or higher layers and signals for MAC Control and Reconciliation sublayers, the present invention can be implemented to support switchover within 50 ms or less. In addition, the present invention makes use of standard SDH/SONET APS definitions and process, therefore it can support protection for linear, mesh, and ring topologies, physical level, logical level, and path level protection, and 1+1, N+1, and N:1 protection.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. A device providing SDH/SONET Automatic Protection Switching (APS) functionality in an Ethernet environment, comprising:
    an Ethernet APS Bridge Selector configured to implement SDH/SONET APS functionality for multiple different network topologies in an Ethernet environment, the Ethernet APS Bridge Selector providing one of a SDH/SONET APS Bridge configured to transmit traffic on working and protect channels or a SDH/SONET APS Selector configured to select a better signal from two received traffic signals on the working and protect channels; and
    an Ethernet APS Bridge Selector Sublayer for managing the Ethernet APS Bridge Selector;
    wherein the Ethernet APS Bridge Selector interconnects Media Access Control (MAC) hardware and a plurality of Physical Layer (PHY) hardware devices.

2. The device of claim 1, wherein the MAC interfaces with the Ethernet APS Bridge Selector.

3. The device of claim 1, wherein the Ethernet APS Bridge Selector interfaces with the plurality of PHY hardware devices.

4. The device of claim 1, wherein the Ethernet APS Bridge Selector enables Standard SDH/SONET APS functionality in an Ethernet Architecture.

5. The device of claim 1, wherein the Ethernet APS Bridge Selector comprises at least one of a bridge or a selector.

6. The device of claim 1, wherein the Ethernet APS Bridge Selector executes bridging operations.

7. The device of claim 1, wherein the Ethernet APS Bridge Selector executes selector operations.

8. The device of claim 1, wherein the Ethernet APS Bridge Selector executes switching operations.

9. The device of claim 1, wherein the Ethernet APS Bridge Selector enables drop and continue functionality.

10. The device of claim 1, wherein the Ethernet APS Bridge Selector enables pass through functionality.

11. The device of claim 1, wherein the Ethernet APS Bridge Selector interfaces with a MAC using RS interface primitives.

12. The device of claim 1, wherein the Bridge Selector Sublayer interface comprises a PHY interface in the form of one of XGMII, GMII, or MII.

13. The device of claim 1, wherein the Bridge Selector Sublayer interface comprises an Attachment Unit Interface (AUI) in the form of XAUI.

14. The device of claim 1, wherein the Ethernet APS Bridge Selector interfaces the PHY using a MAC to PHY interconnect interface.

15. The device of claim 1, wherein the Ethernet APS Bridge Selector bridges between the plurality of PHY hardware devices.

16. The device of claim 1, wherein the Ethernet APS Bridge Selector selects between the plurality of PHY hardware devices.

17. The device of claim 1, wherein the Ethernet APS Bridge Selector switches between the plurality of PHY hardware devices.

18. The device of claim 1, wherein the Ethernet APS Bridge Selector provides switchover within 50 ms for recovery and protection functionality.

19. The device of claim 1, wherein the Ethernet APS Bridge Selector provides a PLS interface to control APS functionality.

20. The device of claim 1, wherein the Ethernet APS Bridge Selector provides signals in the form of one of XGMII or XAUI, to control APS functionality.

21. The device of claim 1, wherein the Ethernet APS Bridge Selector provides control/register interfaces to control APS functionality.

22. The device of claim 1, wherein the Ethernet APS Bridge Selector is one of unidirectional and bidirectional.

23. The device of claim 1, wherein the Ethernet APS Bridge Selector is utilized in at least one of nested or non-nested combinations.

24. The device of claim 1, further comprising a plurality of MAC sublayers that control the Ethernet APS Bridge Selector.

25. The device of claim 1, wherein the Ethernet APS Bridge Selector is controlled by a MAC Client in the form of at least one of APS or OAMP.

26. The device of claim 1, wherein the Ethernet APS Bridge Selector is controlled by software in the form of at least one of APS Controller software or OAMP software.

27. The device of claim 1, further comprising hardware implementing a plurality of Ethernet APS Bridge Selector devices.

28. The device of claim 1, wherein the Ethernet APS Bridge Selector devices are implemented in at least one of a MAC, XGXS, XAUI, or PHY hardware device.

29. The device of claim 1, wherein the multiple different network topologies comprise linear topology networks, ring topology networks, or mesh topology networks.

30. The device of claim 1, wherein the traffic transmitted by the SDH/SONET APS Bridge is identical traffic.

31. A method of providing SDH/SONET APS functionality for a MAC hardware device and a plurality of PHY hardware devices, comprising:
providing a Bridge Selector APS sublayer configured to enable bridging in for multiple different network topologies;
configuring the Bridge Selector APS sublayer in a bridge mode for providing SDH/SONET APS Bridging functionality to transmit traffic on working and protect channels for; and
bridging a MAC hardware device to a plurality of PHY hardware devices;
wherein the Bridge Selector APS sublayer interfaces to MAC transmit signals and bridges signals to a plurality of PHY transmit signals.

32. The method of claim 31, wherein the Bridge Selector APS Sublayer interface comprises an RS interface in the form of PLS.

33. The method of claim 31, wherein the Bridge Selector APS Sublayer interface comprises an MII interface in the form of at least one of XGMII, GMII, or MII.

34. The method of claim 31, wherein the Bridge Selector APS Sublayer interface comprises an AUI in the form of XAUI.

35. The method of claim 31, wherein the Bridge Selector APS sublayer comprises a bridge configured to be in pass through mode wherein an input interface passes through to an output interface.

36. The method of claim 31, wherein the multiple different network topologies comprise linear topology networks, ring topology networks, or mesh topology networks.

37. A method of providing SDH/SONET APS functionality for a MAC hardware device and a plurality of PHY hardware devices, comprising:
providing a Bridge Selector APS sublayer configured to enable selecting for multiple different network topologies;
configuring the Bridge Selector APS sublayer selector mode for providing SDH/SONET APS Selector functionality to select a better signal of two received traffic signals on working and protect channels;
the Bridge Selector APS Sublayer selecting from the plurality of PHY hardware devices for connection to the MAC hardware device;
the Bridge Selector APS Sublayer interfacing to a plurality of PHY receive signals and selecting signals to MAC receive signals; and
switching over from an active channel to one of a standby channel or a specified channel when requested.

38. The method of claim 37, wherein the Bridge Selector APS Sublayer interface comprises an RS interface in the form of PLS.

39. The method of claim 37, wherein the Bridge Selector APS Sublayer interface comprises an MII interface in the form of at least one of XGMII, GMII, or MII.

40. The method of claim 37, wherein the Bridge Selector APS Sublayer interface comprises an AUI in the form of XAUI.

41. The method of claim 37, wherein the Bridge Selector APS Sublayer comprises a bridge configured to be in pass through mode, wherein an input interface passes through to output interfaces.

42. The method of claim 37, wherein the step of switching over executes within 50 ms to provide recovery functionality on an Ethernet protocol network.

43. The method of claim 37, wherein the multiple different network topologies comprise linear topology networks, ring topology networks, or mesh topology networks.

44. A method of providing SDH/SONET APS functionality on an Ethernet protocol network, comprising the steps of:
providing an Ethernet APS Bridge Selector configured to enable bridging for multiple different network topologies;
configuring the Ethernet APS Bridge Selector in bridge mode to provide a SDH/SONET APS Bridge to transmit traffic on working and protect channels; and
bridging transmit traffic to working and protect channels on an Ethernet protocol network.

45. The method of claim 44, wherein the multiple different network topologies comprise linear topology networks, ring topology networks, or mesh topology networks.

46. A method of providing SDH/SONET APS functionality on an Ethernet protocol network, comprising the steps of:
providing an Ethernet APS Bridge Selector configured to enable selecting for multiple different network topologies;

configuring the Ethernet APS Bridge Selector in selector mode to provide a SDH/SONET APS Selector to select a better signal of two received traffic signals on working and protect channels on an Ethernet protocol network;

selecting receive traffic from at least one of working or protect channels; and switching from an active channel to one of a standby channel or a specified channel when requested.

47. The method of claim 46, wherein the method executes within 50 ms to provide recovery functionality.

48. The method of claim 46, wherein the multiple different network topologies comprise linear topology networks, ring topology networks, or mesh topology networks.

49. A method of providing SDH/SONET APS functionality on an Ethernet protocol network comprising the steps of:

providing an Ethernet APS Bridge Selector configured to enable bridging and selecting for multiple different network topologies;

one of bridging and transmitting traffic on working and protect channels or selecting a better signal of two received traffic signals on the working and protect channels, by an Ethernet APS Bridge Selector implementing SDH/SONET APS on an Ethernet protocol network, between a MAC hardware device and a plurality of PHY hardware devices; and switching, by the Ethernet APS Bridge Selector, over from an active channel to one of a standby channel or a specified channel when requested.

50. The method of claim 49, wherein the multiple different network topologies comprise linear topology networks, ring topology networks, or mesh topology networks.

51. The method of claim 49, wherein the method executes within 50 ms to provide recovery functionality.

52. The method of claim 49, wherein the multiple different network topologies comprise linear topology networks, ring topology networks, or mesh topology networks.

* * * * *